March 16, 1926.
R. BOIZARD
1,576,897
MIRROR OF REFLECTOR WATER LEVEL GAUGES
Filed June 16, 1924
Fig.1
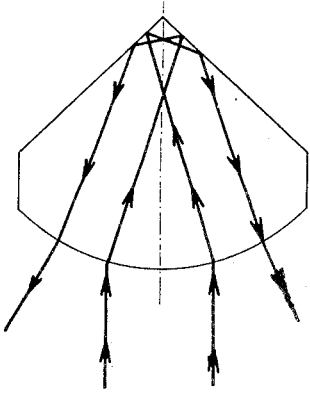
Fig. 4
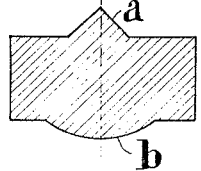
Fig.2
Fig.3
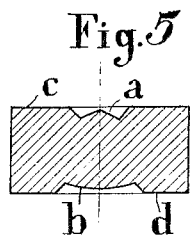
Fig.5
INVENTOR:
Raoul Boizard
BY
ATTORNEY Patented Mar. 16, 1926.

1,576,897

UNITED STATES PATENT OFFICE.

RAOUL BOIZARD, OF PARIS, FRANCE.

MIRROR OF REFLECTOR WATER-LEVEL GAUGES.

Application filed June 16, 1924. Serial No. 720,404.

*To all whom it may concern:*

Be it known that I, RAOUL BOIZARD, a citizen of the Republic of France, residing at Paris, France, have invented certain new and useful Improvements to the Mirrors of Reflector Water-Level Gauges, of which the following is a specification.

With hitherto known mirrors of reflector water-level gauges, reflection is obtained by means of a series of prismatic striæ or grooves cut side by side in the face of the said mirrors in contact with the liquid to be gauged.

Now, whatever the glass used, such small sized striæ or grooves offer the serious drawback of becoming rapidly spoilt or easily clogged, thereby losing their reflecting qualities or powers.

The purpose of my invention is to provide a new reflecting mirror for boiler or other gauges that will do away with the above stated drawbacks.

The mirror which is the object of my invention is essentially characterized by the combination of a single prismatic ridge formed on the face in contact with the liquid to be gauged and opposite a suitably shaped convex wall formed on the outer face in such a way that the luminous rays absorbed and reflected by the ridge on the inner face will be dispersed at a wide angle by the outer convex wall, or, in other words, so that the luminous effects of the ridge will be magnified by the convex wall or lens.

In order to make my invention more clearly understood I have illustrated, as an example, a method of making a mirror in accordance therewith in and by drawings appended hereto, one of the figures shown thereby relating, however, to known reflector mirrors, so as more plainly to demonstrate the difference existing between the two devices.

In the said drawings:

Figure 1 is a cross section of a reflecting mirror as hitherto in use and having prismatic striæ or grooves on its outer face;

Figure 2 illustrates a reflector mirror embodying all the characteristics of my invention, that is to say having a single ridge which may be disposed opposite a convex wall, so that the latter will magnify the luminous effects obtained by the prismatic ridge.

Figure 3 shows a modification of the mirror illustrated by Figure 2.

Figure 4 indicates diagrammatically the path of the luminous rays between a single prismatic ridge and an opposite convex wall, together with the reflected and magnified luminosity effects which are the object of my invention.

Figure 5 relates to a form of mirror which can be dressed on both its faces.

As will be apparent from the drawings $a$ denotes the single inner ridge and $b$ the opposite convex wall.

The foregoing explanations will enable it to be readily understood that with the novel mirror the drawbacks offered by the reflector glass with multiple prismatic striæ will be avoided since:

1. The single ridge, being larger, will wear more slowly than each of the small striæ of the usual model;

2. There being but a single ridge, the danger of small grooves being clogged by the impurities contained in suspension in boiler waters is no longer to be feared.

3. Due to the magnifying of the luminous effects of the single ridge, this ridge can be so established as to leave at the edges of the mirror much more room for the joint than is usually the case with prism-grooved mirrors.

4. The shape of the mirror itself will permit it to be obtained by moulding, a method impracticable with the usual striæ which must be cut; whence a reduction of its cost.

As shown by Figure 5, I can, in view of permitting both faces $c—d$ to be dressed, sink ridge $a$ and convex wall or lens $b$ in the body of the glass, so that faces $c—d$ will protrude to a greater extent than the ridge and than the lens. I can, then, after moulding the mirror under pressure, dress the faces $c—d$.

I can also obtain ridge $a$ as shown by Figure 5 and omit convex wall $b$, face $d$ then being flat.

Having now particularly ascertained and described the nature of my said invention as well as the manner in which the same is to be performed, I declare that what I claim is:

1. A reflector mirror for boiler and other high pressure level gauges, comprising an elongated glass body which is provided on its inner face with a single centrally-arranged, longitudinal ridge, and which is provided on its outer face with a centrally-arranged, convex, longitudinal wall; said ridge being of prism-section and of substantial width, and said convex wall being located directly opposite the ridge so as to magnify the luminous effects produced thereby.

2. A reflector mirror, according to claim 1, in which both the ridge and the convex wall are sunk into the glass body so as to lie inwardly of the limiting planes formed by the opposite faces of said body.

3. A reflector mirror, according to claim 1, in which the ridge and the convex wall constitute companion parts, one of such parts being sunk into the glass body so as to lie inwardly of the limiting plane formed by the adjacent face of said body.

4. A reflector mirror, according to claim 1, in which the opposite faces of the glass body are dressed in order to insure tight joints; and in which the ridge and the wall have their marginal longitudinal edges spaced an appreciable distance from the longitudinal marginal edges of said faces so as to provide relatively-wide contact surfaces for the joints.

5. A reflector mirror, according to claim 1, in which the opposite faces of the glass body are, in the main, flat and dressed to insure tight joints; and in which the ridge and the convex wall are respectively sunk beneath said flat faces so as to lie inwardly of the limiting planes formed by said faces, said rib and wall having their marginal longitudinal edges spaced an appreciable distance from the longitudinal marginal edges of said dressed faces so as to provide relatively wide contact surfaces for the joints.

In testimony whereof I affix my signature.

RAOUL BOIZARD.